Dec. 22, 1953 W. M. SIMPSON 2,663,165
ABSORPTION REFRIGERATION
Filed Nov. 2, 1951 2 Sheets-Sheet 1

INVENTOR.
Walter M. Simpson
BY
Oliver S. Titcomb
his ATTORNEY

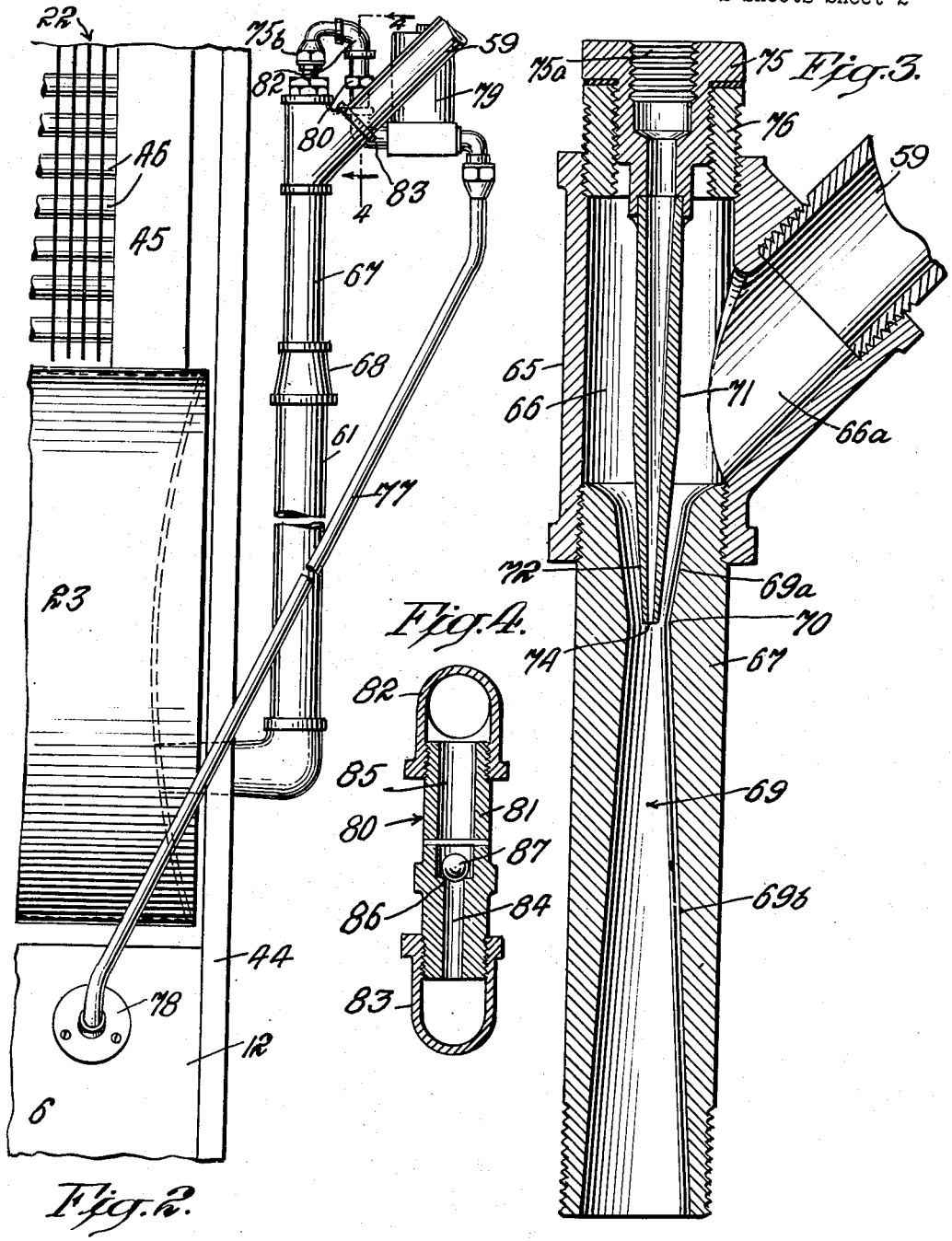

Patented Dec. 22, 1953

2,663,165

UNITED STATES PATENT OFFICE 2,663,165

ABSORPTION REFRIGERATION

Walter M. Simpson, Evansville, Ind., assignor to Servel, Inc., New York, N. Y., a corporation of Delaware Application November 2, 1951, Serial No. 254,560

8 Claims. (Cl. 62—119)

The present invention relates to refrigeration and more particularly to the treatment of cooling water used to cool the heat rejecting parts of the refrigeration system to prevent the formation of scale or bacterial slime in the cooling water circuit.

Air conditioners utilizing a heat operated refrigeration system have been used extensively for air conditioning residences, restaurants, stores and the like. The air conditioner is a self-contained unit having means for heating the heat receiving element of the system and comprising a fuel burner and a flue for the products of combustion. Cooling water is passed in heat exchange relation with the heat rejecting elements of the system and in many installations the cooling water is recirculated through a cooling tower to conserve water. Recirculation of the cooling water through a cooling tower in localities having hard water is apt to increase the concentration of the mineral salts therein, usually in the form of carbonates or including some carbonates, to such a degree that they precipitate on the conduits and form a scale. In other installations cooling water is supplied from city water mains or wells and in some localities the concentration of mineral salts is so high as to cause precipitation and scaling of the conduits during a single pass therethrough. Such scale increases the resistance to flow and decreases the heat transfer characteristics of the conduits. It has been found that if flue gas is introduced into the water, the mineral salts do not precipitate, scaling of the conduits is avoided and bacterial slime in the cooling tower is materially reduced.

One of the objects of the present invention is to provide an improved water treating apparatus for introducing flue gas from the fuel burner into the cooling water adjacent the heat rejecting element of the refrigeration system.

Another object is to provide an apparatus for the flue gas treatment of cooling water which utilizes the flow of cooling water through a Venturi tube in the cooling water circuit at a location remote from the circulating pump to draw in flue gas at a controlled rate.

Another object is to provide an apparatus of the type indicated which utilizes the flow of all of the cooling water through a Venturi tube to treat water having the highest concentration of mineral salts expected to be encountered and controls the amount of flue gas delivered in accordance with requirements in the particular locality.

Still another object is to provide an apparatus for introducing flue gas into the cooling water which is of a simple and compact construction, adapted to supply the proper amount of flue gas for the mineral concentration in any particular locality and insure the flow of cooling water at a constant rate.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims. In the drawings:

Fig. 2 is a side elevational view of a portion of an air conditioning unit showing the Venturi tube located adjacent the source of flue gas and heat rejecting element of the refrigeration system;

Fig. 3 is an enlarged sectional view of the Venturi tube illustrated in Fig. 2 and showing the nozzle for introducing flue gas at the throat of the venturi; and Fig. 4 is a sectional view of the check valve in the flue gas line.

Figure 1:
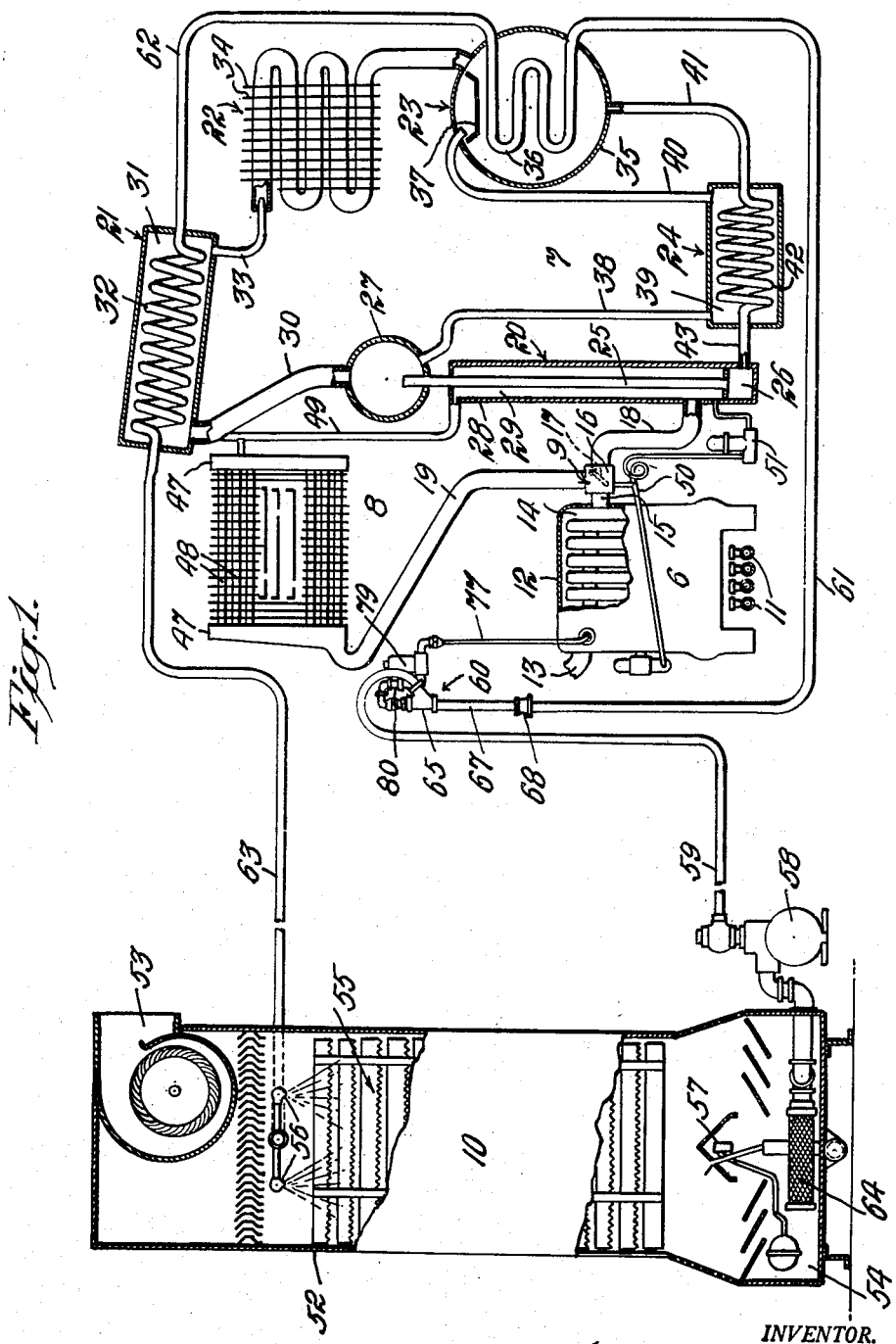
Fig. 1 is a diagrammatic view of an air conditioning apparatus incorporating the novel features of the present invention.

Referring to Fig. 1 of the drawings, the present invention is shown applied to an air conditioning apparatus for either cooling the air in the summer or heating air in the winter. The air conditioning apparatus comprises a source of heat illustrated in the form of a steam boiler 6, a heat operated refrigeration system 7, a heating system 8, a selective valve 9 for directing steam from the boiler to the heating system or refrigeration system, respectively, and a cooling tower 10.

Boiler 6 may be of any suitable type such as the sectional cast-iron boiler illustrated and may be heated by any suitable fuel burner such as the gas burners 11. The sections of the boiler 6 are enclosed in a casing or hood 12 having an outlet pipe 13 and the hood and outlet pipe form a flue 14 for the products of combustion. The heat from the flame and products of combustion is transmitted through the walls of the boiler sections to heat the water therein to generate steam. Steam from the boiler 6 flows through a steam pipe 15 to chamber 16 of selective valve 9 and a valve element 17 in the chamber directs the steam through the conduit 18 to the refrigeration system 7 or through the conduit 19 to the heating system 8. The present invention also may be applied to a direct fired arrangement in which the heat from the products of combustion is transferred directly to the heat receiving element of the refrigeration system.

The heat operated refrigeration system 7 is shown in Fig. 1 as an absorption system of the type illustrated and described in United States Letters Patent to Albert R. Thomas et al. 2,282,503 issued May 12, 1942, and entitled Refrigeration. Such an absorption refrigeration system operates in a partial vacuum and utilizes a refrigerant such as water and a liquid absorbent such as a solution of lithium bromide. The refrigeration system comprises a generator 20, condenser 21, evaporator 22, absorber 23 and heat exchanger 24 interconnected for the flow of refrigerant and absorbent. Generator 20 has at least one vapor liquid-lift tube 25 connected between a lower inlet chamber 26 and an upper separating chamber 27 and the lift tube is enclosed in a jacket 28 providing a heating chamber 29 therebetween. The heat of the steam supplied to the heating chamber 29 is transmitted through the wall of the lift tube 25 to expel refrigerant vapor from absorption solution therein and lift the solution into the separating chamber 27 by vapor-lift action.

Vapor from the separating chamber 27 flows through the conduit 30 to the condenser 21. The condenser 21 is illustrated diagrammatically as comprising a chamber 31 having a cooling coil 32 therein. Liquid refrigerant from the chamber 31 of condenser 21 flows by gravity through a restricting pipe 33 into the top of evaporator 22 illustrated in the form of a serpentine coil having spaced heat transfer fins 34. Refrigerant vapor from the evaporator coil 22 flows to the absorber 23. The absorber 23 is in the form of a hermetically sealed shell or casing 35 having heat transfer coils 36 therein and liquid distributing means 37 overlying the coils for distributing absorption liquid for gravity flow over the coils.

Simultaneously with the flow of refrigerant vapor to the condenser 21, absorption solution weak in refrigerant flows by gravity from the separating chamber 27 to the liquid distributor 37 in absorber 23 in a path of flow including conduit 38, outer passage 39 of heat exchanger 24 and conduit 40. Due to the high affinity of the refrigerant, water, for the absorption solution, lithium bromide, the refrigerant evaporates in the evaporator 22 at a low pressure and temperature to produce a refrigerating effect and the refrigerant vapor is absorbed in the absorption solution as fast as it is formed in the evaporator. The absorption solution strong in refrigerant flows by gravity from the absorber 23 to the inlet chamber 26 of generator 20 in a path of flow including conduit 41, inner passage 42 of liquid heat exchanger 24 and conduit 43.

While the heat operated absorption refrigeration system is illustrated diagrammatically in Fig. 1, the commercial apparatus has all of the elements of the system mounted on a frame to provide a self contained unit. In Fig. 2 a portion of such a refrigeration unit is illustrated to show the general location of the elements. The boiler 6 is mounted on the frame between upright stanchions 44 and absorber 23 overlies the boiler. Evaporator 22 is located above absorber 23 and has a header 45 opening into the top of the absorber with finned tubes 46 extending laterally from header 45 to a similar header adjacent the opposite end of the absorber. Thus, it will be noted that the boiler 6 and flue 14 for the products of combustion are located closely adjacent the absorber 23.

The heating system comprises a radiator 8 having spaced headers 47 with finned tubes 48 extending between the headers. The steam conduit 19 from the selective valve 9 is connected to one of the headers 47 and steam flows through the tubes 48 in parallel and condensate returns through the lowermost tube and conduit 19 back to the selective valve 9. Both the heating chamber 29 for the generator 20 of the refrigeration system and a header 47 of the heating system are vented to the atmosphere by a common vent pipe 49 to maintain the steam from the boiler 6 at atmospheric pressure. Condensate drains from chamber 16 of selective valve 9 back to boiler 6 through a conduit 50 and a condensate return pump 51 connected to heating chamber 29 of generator 20 lifts condensate therefrom to the conduit 50.

Cooling tower 10 is usually located at a place remote from the refrigeration system and may be of any suitable construction. As illustrated, the cooling tower is generally similar to that illustrated and described in my prior United States Letters Patent 2,562,827 issued July 31, 1951. Suffice it to state herein that the cooling tower comprises an upright casing 52 having a fan 53 at the top of the casing, a sump 54 at the base of the casing, packing 55 in the intermediate portion of the casing, distributing nozzles 56 between the fan and the packing and a water make-up valve 57 in the sump. A pump 58 at the base of cooling tower 10 draws water from sump 54 through a filter 64 and circulates it in a circuit through the cooling coils 36 of absorber 23 and cooling coil 32 of condenser 21. The circuit comprises a conduit 59 connected between the outlet from the pump 58 and a water operated aspirator 60, later to be described in detail, a conduit 61 connecting the outlet end of the aspirator to one end of the cooling coil 36 in absorber 23, a conduit 62 connecting the outlet from the cooling coil 36 to one end of the cooling coil 32 of condenser 21 and a conduit 63 connecting the opposite end of the condenser cooling coil 32 to the nozzles 56 in the cooling tower 10.

In accordance with the present invention, an apparatus is provided for treating the cooling water with flue gas to eliminate scale in the heat transfer conduits of the heat rejecting parts of the refrigeration system and reduce the growth of bacterial slime in the cooling tower. This is accomplished by the water operated aspirator 60 which utilizes the flow of cooling water therethrough to draw flue gases into the water at a controlled rate. One of the features of the invention resides in the location of the aspirator 60 in a conduit of the cooling water circuit adjacent both the heat rejecting parts of the refrigeration system and flue for the products of combustion. Another feature of the invention resides in connecting the aspirator 60 to the cooling water circuit so that all of the cooling water flows therethrough to produce a suction sufficient to draw in the amount of flue gas required for the most extreme condition, but adapted to utilize only the amount of gas required for the water in the particular locality where it is used. Still another feature of the invention resides in the arrangement of the flue gas treating apparatus so that it does not interfere with the operation of the circulating pump to maintain flow at a constant rate.

As illustrated in Fig. 3, the aspirator 60 comprises a pipe fitting 65 forming a chamber 66 with an angular inlet port 66a at the side thereof to which conduit 59 from pump 58 of the cooling water circuit is connected. A Venturi tube 67 has its upper end connected to the bottom of the pipe fitting 65 by a screw threaded connection and its lower end connected to conduit 61 by a suitable pipe coupling 68, see Fig. 2. Venturi tube 67 has an axial passge 69 formed by an upper converging portion 69a and a lower diverging portion 69b providing a throat 70 therebetween. A removable nozzle 71 extends axially through the chamber 66 and has a tapered end 72 with a measured orifice or mouth 74 terminating at the throat 70 of the Venturi tube. Nozzle 71 is sealed in the axial opening of a gland nut 75 which, in turn, is screwed into a short nipple 76 sealed in the upper end of the pipe fitting 65 and providing a seat to compress a suitable packing between it and the gland nut. The arrangement of the short nipple 76 and gland nut 75 provides for accurately locating the mouth 74 of nozzle 71 at the throat 70 of the Venturi tube 67. The gland nut 75 is also provided with a tapped bore 75a for receiving a suitable pipe or tube coupling 75b, see Fig. 2. In any installation the amount of flue gas necessary for the water in the particular locality is determined and a nozzle 71 having the proper sized mouth 74 is applied to the pipe fitting 65 to deliver the amount of flue gas required. Thus, the Venturi tube 67 will produce a predetermined suction at the throat 70 and the measuring orifice or mouth 74 of nozzle 71 controls the flow through the nozzle at the particular suction.

Nozzle 71 of the aspirator 60 is connected to the hood 12 of boiler 6 by means of a conduit 77 having its lower end extending into the hood 12 and connected thereto by a plate 78, see Fig. 2. The opposite end of conduit 77 is attached to the pipe or tube coupling 75b in the tapped recess 75a of gland nut 75. The flow of flue gas from flue 14 of boiler 6 is controlled by a magnetically operated control valve 79 and a check valve 80, the magnetic valve being opened when the refrigeration system is selected for operation and the check valve permitting the flow of flue gas toward the aspirator 60 but preventing the flow of cooling water toward the boiler 6. Check valve 80 may be of any suitable type and as illustrated in Fig. 4 comprises a pipe fitting 81 connected at its opposite ends to elbows 82 and 83. Fitting 81 has an axial bore 84 and a counter-bore 85 in the upper portion providing a valve seat 86 therebetween. A ball 87 in counter-bore 85 is adapted to engage valve seat 86 by gravity to close the passage therethrough and to move away from the valve seat to permit flue gas to flow through the check valve when a sufficient pressure differential exists between the opposite ends of the fitting. One form of the invention having now been described in detail, the mode of operation is explained as follows:

To initiate operation of the air conditioning apparatus, gas burners 11 are ignited to heat boiler 6 and generate steam therein. When heating is desired, the element 17 of selective valve 9 is actuated to close conduit 18 and open conduit 19. Steam from boiler 6 then flows through selective valve 9 and conduit 19 to the radiator of heating system 8 and air to be conditioned is circulated over the radiator by means of a fan, not shown. Steam from boiler 6 is maintained at atmospheric pressure in the radiator by vent conduit 49.

When cooling and dehumidification of the air is desired, the element 17 of selective valve 9 is actuated to close conduit 19 and open conduit 18, operation of the condensate return pump 51 is initiated, operation of fan 53 and pump 58 of cooling tower 10 initiated, and magnetic valve 79 in the flue gas line opened. Steam from the boiler 6 then flows through the selective valve 9 and conduit 18 to the heating chamber 29 for the generator 20 of the absorption refrigeration system. Heat supplied to the generator 20 expels refrigerant vapor from absorption solution and the vapor flows through the separating chamber 27 and conduit 30 to condenser 21 which delivers liquid refrigerant to the evaporator 22. Simultaneously, absorption solution is delivered from the separating chamber 27 to the liquid distributing means 37 in absorber 23. Liquid absorbent is distributed by means 37 for gravity flow over the cooling coils 36 in thin films to facilitate the absorption of refrigerant vapor and such absorption of refrigerant vapor in the absorber reduces the vapor pressure and temperature of the refrigerant in evaporator 22 to produce a cooling effect on air circulating over the evaporator.

Simultaneously, cooling water is circulated by the pump 58 from the sump 54 of cooling tower 10 through the cooling water circuit including the cooling coils 36 and 32 of absorber 23 and condenser 21, respectively, which constitute the heat rejecting elements of the refrigeration system. The cooling water is delivered from the pump 58 through the conduit 59 into the chamber 66 of the aspirator 60, see Fig. 3, and then flows through the converging portion 69a and diverting portion 69b of the axial passage 69 of Venturi tube 67 successively. The converging portion 69a converts the pressure head of the cooling water to a velocity head at the throat 70 and diverging portion 69b converts the velocity head back to a pressure head. The velocity of the cooling water as it passes the mouth 74 of nozzle 71 at throat 70 produces a partial vacuum or suction to draw flue gas into the water as it flows therethrough. The flue gas is drawn from the flue 14 of boiler 6 through the conduit 77, open magnetic valve 79, check valve 80 and nozzle 71. Check valve 80, however, prevents the flow of gas into the nozzle 71 until a negative pressure has been produced at the mouth 74 of nozzle 71 by the flow of cooling water through the throat 70 of Venturi tube 67. After a very short period of operation the flow of cooling water through the throat 70 will produce a predetermined fixed negative pressure at the throat and mouth 74 of nozzle 71 will pass the amount of flue gas at the particular suction which is required for the water at the particular locality. It will be understood that nozzle 71 is interchangeable and after the mineral content of the water at a particular locality has been determined, a nozzle with the proper mouth opening 74 will be used to supply flue gas to the water at a controlled rate.

While the theory of flue gas treatment of cooling water is not essential to the present invention, it is believed that the carbon dioxide of the flue gas products combines with the insoluble mineral carbonates to convert them to soluble bicarbonates, for example:

$$CaCO_3 + CO_2 + H_2O \rightarrow Ca(HCO_3)_2$$

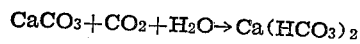

The make-up water supplied to the cooling water circuit probably contains some of the soluble bicarbonates and some of the insoluble carbonates and in some instances mineral salts in other forms. As the cooling water passes through the cooling tower in finely divided form in contact with the moving air stream it is probable that a reverse reaction occurs, that is, some of the $CO_2$ leaves the mineral salts and passes into the air stream converting the soluble bicarbonates to insoluble carbonates. Thus, by adding $CO_2$ to the water after it leaves the cooling tower the water is restored to its original condition and additional insoluble carbonates converted to soluble bicarbonates. The alternate precipitation and dissolving of carbonates also prevents the formation of a hard or permanent layer of the other mineral salts.

Whatever the reason, it has been found that the flue gas treatment of cooling water reduces the scale in the cooling coils 36 and 32 of the absorber 23 and condenser 21, respectively. It also has been found that such treatment reduces the bacterial slime usually found in the cooling tower packing and sump. This latter effect may be due to toxic ingredients in the flue gas such as sulphur. When the cooling water is sprayed through the nozzles 56 of the cooling tower the flue gases apparently escape with the air passing upwardly through the tower as stated above which reconverts the soluble bicarbonates to the insoluble carbonates and causes them to precipitate on the packing and in the sump of the cooling tower 10. This is desirable as the cooling tower surfaces can be readily cleaned whereas the cleaning of the cooling coils 36 and 32 in the absorber 23 and condenser 21, respectively, is quite difficult to accomplish.

It will now be observed that the present invention provides a novel arrangement for the flue gas treatment of cooling water used to remove heat from the heat rejecting parts of a heat operated refrigeration system. It will further be observed that the present invention utilizes the flow of all of the cooling water through a Venturi tube located adjacent the refrigeration unit to produce a sufficient suction to draw in an amount of flue gas required for any condition. It will still further be observed that the present invention provides an arrangement in combination with a Venturi tube to supply the proper amount of flue gas for the mineral concentration in the particular locality at a constant rate.

While a single embodiment of the invention is herein illustrated and described, it will be understood that modifications may be made in the construction and arrangement of elements without departing from the spirit and scope of the invention. Therefore, without limitation in this respect, the invention is defined by the following claims.

I claim:

1. In combination with a heat operated refrigeration system having a heat receiving element and a heat rejecting element, means for heating the heat receiving element comprising a fuel burner and a flue for the products of combustion, a conduit for flowing cooling water in heat exchange relation with the heat rejecting element, a Venturi tube in said conduit adjacent the flue and heat rejecting element, and a conduit connecting the flue and Venturi tube to cause flue gases to be drawn into the cooling water.

2. In combination with a heat operated refrigeration system having a heat receiving element and a heat rejecting element, means for heating the heat receiving element comprising a fuel burner and a flue for the products of combustion, a conduit for flowing cooling water in heat exchange relation with the heat rejecting element, a Venturi tube in said conduit adjacent the heat rejecting element and flue and through which all of the cooling water passes, a removable nozzle having a measuring orifice at the throat of the Venturi tube, and a conduit connecting the flue and nozzle to cause flue gases to be drawn into the cooling water at a controlled rate.

3. In combination with a heat operated refrigeration system having a heat receiving element and a heat rejecting element, means for heating the heat receiving element comprising a fuel burner and a flue for the products of combustion, a conduit for flowing cooling water in heat exchange relation with the heat rejecting element, a Venturi tube in said conduit adjacent the heat rejecting element and flue and having an inlet port extending at an angle to the axis of the tube, a removable nozzle in axial alignment with the tube and having a measuring orifice at the throat of the tube, and a conduit connecting the flue and nozzle to cause flue gas to be drawn into the cooling water at a rate controlled by the measuring orifice of the nozzle.

4. In combination with a heat operated refrigeration system having a heat receiving element and a heat rejecting element, means for heating the heat receiving element comprising a fuel burner and a flue for the products of combustion, a conduit for flowing cooling water in heat exchange relation with the heat rejecting element, a Venturi tube in said conduit adjacent the flue and heat rejecting element and through which all of the cooling water passes, a conduit connected between the flue and throat of the Venturi tube, and valve means in the last named conduit.

5. In combination with a heat operated refrigeration system having a heat receiving element and a heat rejecting element, means for heating the heat receiving element comprising a fuel burner and a flue for the products of combustion, a conduit for flowing cooling water in heat exchange relation with the heat rejecting element, a Venturi tube in said conduit adjacent the flue and heat rejecting element and through which all of the cooling water passes, a conduit connected between the flue and throat of the Venturi tube, and a magnetically operated control valve and an automatically operated check valve in the flue gas conduit.

6. In combination with a heat operated refrigeration unit having a heat receiving element, a heat rejecting element with a cooling means therein and means for heating the heat receiving element comprising a fuel burner and a flue for the products of combustion, an evaporative water cooler remote from the refrigeration unit, a circuit for the cooling water having conduits connecting the evaporative water cooler and cooling means of the heat rejecting element, a pump adjacent the evaporative water cooler for circulating cooling water through the circuit, a Venturi tube in the circuit adjacent the refrigeration unit, and a conduit connecting the flue and Venturi tube and so constructed as to cause flue gas to be drawn into the cooling water at a controlled rate.

7. In combination with a heat operated refrigeration unit having a heat receiving element, a heat rejecting element with cooling means and means for heating the heat receiving element comprising a fuel burner and flue for the products of combustion, said flue being located adjacent the heat rejecting element, an evaporative water cooler remote from the refrigeration unit and having a pump, a circuit for cooling water having a conduit connecting the pump and cooling means for the heat rejecting element, a Venturi tube in the conduit adjacent the heat rejecting element and flue, a removable nozzle located axially of the Venturi tube and having a measuring orifice at the throat thereof, and a conduit connecting the flue and nozzle to cause flue gas to be drawn into the cooling water at a controlled rate.

8. In combination, a heat operated refrigeration unit having a frame, a boiler mounted on the frame, an absorber mounted on the frame above the boiler, an evaporator above the absorber and a condenser above the evaporator, said absorber and condenser each having a cooling means therein and said boiler having a flue for products of combustion, an evaporative water cooler remote from the refrigeration unit and having a pump, a circuit for cooling water having conduits connecting the pump and cooling means of the absorber and condenser, a Venturi tube in the conduit adjacent the absorber, a removable nozzle arranged axially of the Venturi tube and having a measuring orifice at the throat thereof, and a conduit connecting the flue and nozzle to cause flue gas to be drawn into the cooling water adjacent the absorber at a controlled rate.

WALTER M. SIMPSON.

References Cited in the file of this patent

UNITED STATES PATENTS

| Number | Name | Date |
|---|---|---|
| 931,229 | Sepulchre | Aug. 17, 1909 |
| 2,515,319 | Sherwood | July 18, 1950 |